United States Patent
Heitmann et al.

(10) Patent No.: US 11,063,777 B1
(45) Date of Patent: Jul. 13, 2021

(54) DISTRIBUTED ASYNCHRONOUS DOCUMENT EDITING

(71) Applicant: Amazon Technologies, Inc., Seattle, WA (US)

(72) Inventors: John Walter Heitmann, Seattle, WA (US); Brian Jacob Feinstein, Redmond, WA (US); Cory Barrett Kendall, Seattle, WA (US); Viraj Vijay Sanghvi, Seattle, WA (US); Luan Khai Nguyen, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1042 days.

(21) Appl. No.: 14/718,378

(22) Filed: May 21, 2015

(51) Int. Cl.
*G06F 17/00* (2019.01)
*H04L 12/18* (2006.01)
*G06F 3/0484* (2013.01)
*G06F 16/951* (2019.01)
*G06F 40/14* (2020.01)

(52) U.S. Cl.
CPC ........ *H04L 12/1822* (2013.01); *G06F 3/0484* (2013.01); *G06F 16/951* (2019.01); *G06F 40/14* (2020.01)

(58) Field of Classification Search
CPC ... H04L 12/1822; G06F 40/14; G06F 16/951; G06F 3/0484
See application file for complete search history.

(56) References Cited

U.S. PATENT DOCUMENTS

| | | | | |
|---|---|---|---|---|
| 7,225,139 B1* | 5/2007 | Tidwell | ................. | G06Q 10/10 705/7.15 |
| 7,225,249 B1* | 5/2007 | Barry | ..................... | H04L 41/18 709/227 |
| 2006/0178898 A1* | 8/2006 | Habibi | ............... | G06Q 30/0601 705/1.1 |
| 2007/0116185 A1* | 5/2007 | Savoor | ................ | H04M 3/5191 379/9 |
| 2009/0076871 A1* | 3/2009 | Heacock | ................ | G06Q 10/00 705/7.26 |
| 2010/0145718 A1* | 6/2010 | Elmore | ................... | H04L 67/42 705/1.1 |
| 2012/0311228 A1* | 12/2012 | Hsu | ..................... | G06F 12/0246 711/102 |
| 2013/0090976 A1* | 4/2013 | White | ................... | G06Q 10/20 705/7.27 |

(Continued)

*Primary Examiner* — Laurie A Ries
(74) *Attorney, Agent, or Firm* — Lee & Hayes, P.C.

(57) ABSTRACT

Technologies are disclosed herein for asynchronous distributed editing of a structured document, such as a trouble ticket. A document management service receives edits to the structured document. The edits to the structured document include data to be stored in fields of the structured document and information identifying the fields into which the data in the edits is to be stored. The edits are synchronized to other instances of the document management service. Edits to the structured document made at the other instances of the document management service are also received and stored. When a request is received for the structured document, the edits to the document made at the various instances of the document management service are sorted based upon the order in which they were created. The edits are applied in the sorted order to generate the structured document.

20 Claims, 9 Drawing Sheets

(56) References Cited

U.S. PATENT DOCUMENTS

| | | | | |
|---|---|---|---|---|
| 2014/0372376 A1* | 12/2014 | Smith | ............... | G06F 17/30174 |
| | | | | 707/624 |
| 2015/0378972 A1* | 12/2015 | Kapadia | .............. | G06F 17/2288 |
| | | | | 715/229 |
| 2016/0070717 A1* | 3/2016 | Bergner | ................ | G06F 16/178 |
| | | | | 707/638 |
| 2016/0119405 A1* | 4/2016 | Karpoor | ................ | G06Q 10/06 |
| | | | | 709/217 |

* cited by examiner

DISTRIBUTED ASYNCHRONOUS DOCUMENT EDITING

BACKGROUND

It is commonly helpful for computer users that are located in different geographic locations to be able to collaborate on the same document. For example, many organizations utilize systems for maintaining trouble tickets. Trouble tickets are documents that contain information for use in tracking the detection, reporting, and resolution of some type of issue, commonly an issue that is present in a computing system. Users located in various geographic locations can use such a system to collaborate in an attempt to resolve the issues identified by the trouble tickets. It can, however, be difficult to synchronize edits to trouble tickets that are made by users located in different geographic locations.

The disclosure made herein is presented with respect to these and other considerations.

DETAILED DESCRIPTION

Figure 1:
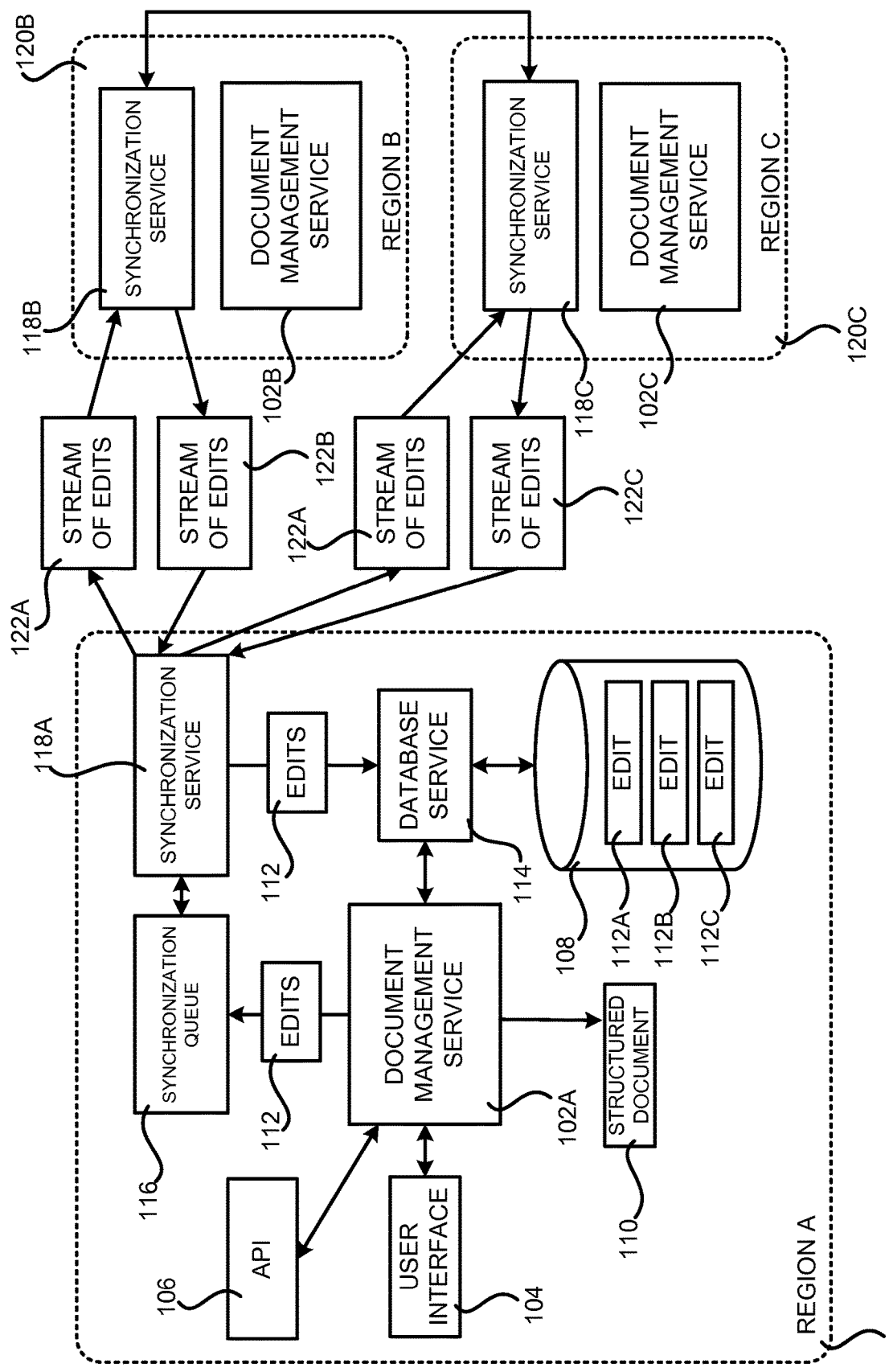
FIG. 1 is a computing system architecture diagram showing aspects of the configuration and operation of several components described herein for distributed asynchronous document editing.

The following detailed description is directed to technologies for distributed asynchronous document editing. Utilizing an implementation of the technologies described herein, edits made to a structured document, such as a trouble ticket, are stored independently and synchronized between systems located in various geographic regions. The edits can be "replayed" in order to generate a consistent version of the document in any region at any point in time following the creation of the document. In this way, users located in different geographic locations can edit documents simultaneously and have the edits synchronized across the different regions in a non-blocking and consistent way.

In order to provide the functionality described briefly above, an instance of a document management service executing in one geographic location receives edits to a structured document, such as a trouble ticket. The edits to the structured document include data to be stored in fields of the structured document and information identifying the fields into which the data in the edits is to be stored. The edits are then synchronized to other instances of the document management service executing in other geographic regions. Edits to the structured document made at the other instances of the document management service are also received and stored.

When a request is received for the structured document (e.g. a request to view or edit the structured document), the edits to the document made at the various instances of the document management service are sorted based upon the order in which they were created. The edits to the structured document are then applied in the sorted order in order to generate the structured document. Additional details regarding the various components and processes described briefly above for distributed asynchronous document editing will be presented below with regard to FIGS. 1-9.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a system architecture diagram showing aspects of the configuration and operation of several components described herein for distributed asynchronous document editing. As shown in FIG. 1, a document management service 102A is provided in one configuration. The document management service 102A generally provides functionality for allowing users to create and modify documents, such as a structured document 110.

In some configurations, the document management service 102A also provides functionality for permitting users in different regions to view and edit the same document. For example, and without limitation, users located in one geographic region 120A can create and/or edit a document 110 using functionality provided by the instance of the document management service 102A executing in the region 120A. Other users, located in the geographic region 120B, can view and edit the same document 110 using functionality provided by the instance of the document management service 102B executing in the geographic region 120B. Similarly, other users located in the geographic region 120C can also view and edit the same document 110 using functionality provided by the instance of the document management service 102C executing in the geographic region 120C. Other users in other geographic regions 120 not shown in FIG. 1 can also view and edit the same document in a similar fashion.

In one configuration, the components shown in FIG. 1 as operating within the geographic region 120A are provided by a data center located in that region 120A. A similar configuration of components (not all of which are shown in FIG. 1) are provided by a data center located in the geographic region 120B. Likewise, a similar configuration of components are also provided by another data center located in geographic region 120C. Details regarding the configuration of such a data center are provided below with regard to FIGS. 6-8.

In one particular configuration, the documents (e.g. the document 110) managed by the document management service 102 are trouble tickets. As discussed briefly above, trouble tickets are documents that contain information for use in tracking the detection, reporting, and resolution of some type of issue, commonly an issue that is present in a computing system. Using the system shown in FIG. 1, users located in the geographic regions 120A-120C can edit a trouble ticket to collaborate in an attempt to resolve the issues identified by the trouble ticket.

A document management service 102 that provides functionality for creating and editing trouble tickets might be referred to herein as a "trouble ticket management service." In this regard, it should be appreciated that while the configurations disclosed herein are primarily presented in the context of trouble tickets, the configurations disclosed herein can be utilized with other types of documents. For example, and without limitation, the configurations disclosed herein might be utilized with other types of documents such as, but not limited to, word processing documents, spreadsheet documents, presentation documents, other types of user documents, HTML documents, XML documents, and/or other types of documents capable of being expressed in a structured format.

In order to provide the functionality described herein, the document management service 102 can provide various types of interfaces through which other services, systems, and users can interact with the document management service 102. For example, and without limitation, the document management service 102 can expose a user interface 104 through which users can create, view, edit, and perform other functions on documents, such as trouble tickets, maintained by the document management service 102. As another example, the document management service 102 can also expose a web service application programming interface ("API") 106 through which other components can submit edits to documents maintained by the document management service 102.

The API 106 might also provide functionality for allowing other components to retrieve edits made to a document 110 at a local instance of the document management service 102A and edits made by users of instances of the document management service 102 located in other regions. In order to provide this functionality, edits made using instances of the document management service 102 located in other regions can be synchronized. Additional details regarding the synchronization process will be provided below with regard to FIG. 5.

In one particular configuration, a component can utilize the API 106 to obtain all of the edits 112 made to a structured document 110. The component can then utilize the edits 112 to generate a current version of the structured document 110 and, for example, present the current version of the structured document 110 in a user interface. In order to update the view of the structured document 110 in the user interface, the component can utilize the API 106 to obtain only new edits 112 made to the document 110. The new edits 112 can then be utilized to update the current view of the document 110. In this way, the amount of data required to be transmitted for the component to maintain a current view of the structured document 110 can be minimized. The API can also be utilized in other ways by other components and systems in other configurations.

It should be appreciated that the various aspects of the user interface 104 and the API 106 described above are merely illustrative and that these interfaces might provide other types of functionality not specifically disclosed herein. Furthermore, although not illustrated in FIG. 1, the instances of the document management service 102B and 102C executing in the regions 120B and 120C, respectively, also provide the interfaces described above for allowing users and components located in those regions to submit and retrieve edits to document.

As discussed briefly above, the document management service 102 provides functionality for creating, editing, and viewing documents, such as the structured document 110. A structured document 110 is an electronic document that utilizes a schema to define structure within the document. For example, and without limitation, such a schema can be utilized to define various fields within a structured document for storing various types of information. When the structured document 110 is a trouble ticket, for instance, fields might be defined for storing information like the creation date for the trouble ticket, the date on which an issue associated with the trouble ticket was resolved, a description of the issue associated with the trouble ticket, the identity of one or more users to which the trouble ticket has been assigned, and/or other types of information relating to the trouble ticket.

In one particular implementation, the structured document 110 (e.g. a trouble ticket) is expressed utilizing JavaScript Object Notation ("JSON"). As known to those skilled in the art, JSON is a language independent data format that is based on the JavaScript programming language. In this regard, it should be appreciated that other data formats can also be utilized including, but not limited to, XML, YAML, OGDL, and CSV. Additional details regarding the format of the structured document 110 will be provided below with regard to FIG. 2.

As shown in FIG. 1, the document management service 114 can utilize a database service 114 to store edits 112 made to a structured document 110. The database service 114 is a network service that provides functionality for creating, populating, querying, and performing other functions on a database, such as the database 110. The database 110 provided by the database service 114 can be implemented as a relational database or another kind of database in other configurations. Other types of data stores might also be utilized in other configurations.

As shown in FIG. 1, the database 108 is utilize to store the edits 112A-112C (collectively, the edits 112) for a structured document 110. For example, and without limitation, when the user interface 104 or the API 106 is utilized to make edits 112 to a structured document 110, the document management service 102A provides the edits 112 to the database service 114 for storage in the database 108. As also shown in FIG. 1, the document management service 102A also places the edits 112 on a synchronization queue 116. As will be described in greater detail below, the synchronization queue 116 is a queue that is utilized to store edits 112 awaiting synchronization to other instances of the management service 102, such as the instances of the management service 102B and 102C illustrated in FIG. 1. The synchronization queue 116 is provided by a queue service in one particular configuration. Additional details regarding the processing of edits 112 to a structured document 110 will be provided below with regard to FIG. 4.

As also shown in FIG. 1, one instance of a synchronization service 118A can retrieve edits 112 from the synchronization queue 116 and transmit the edits 112 to other instances of the synchronization service 118B and 118C. In the example shown in FIG. 1, the instance of the synchronization service 118A executes in the geographic region 120A, the instance of the synchronization service 118B executes in the geographic region 120B, and the instance of the synchronization service 118C executes in the geographic region 120C. Because the synchronization service 118A is continually sending edits 112, the transmission can be considered a "stream" 122 of edits. Consequently, and as shown in FIG. 1, the instance of the synchronization service 118A sends a stream of edits 122A made to the structured document 110 in the region 120A to the instances of the synchronization service 118B and 118C executing in the regions 120B and 120C, respectively.

In a similar fashion, the instance of the synchronization service 118B executing in the region 120B sends a stream of edits 122B made by users in the region 120B to the instance of the synchronization service 118A. Likewise, the instance of the synchronization service 118C executing in the region 120C sends a stream of edits 122C made by users in the region 120C to the instance of the synchronization service 118A. The instance of the synchronization service 118A utilizes the database service 114 to store the edits 112 contained in the stream of edits 122B and the edits 112 contained in the stream of edits 122C in the database 108. In this way, all of the edits 112 made to the structured document 110, regardless of the region 120 in which they are made, are stored in the database 108.

Although not illustrated in FIG. 1, the instances of the synchronization service 118B and 118C executing in the regions 120B and 120C, respectively, are configured to operate in the same manner as the instance of the synchronization service 118A executing in the region 120A and described above. In this way, all of the edits 112 to a structured document 108, regardless of the geographic region in which they are made, are synchronized to all of the regions 120. As will be described in greater detail below, the edits 112 stored in each region 120 can then be utilized to generate the structured document 110 (e.g. for presentation to a user in a suitable user interface, such as the user interface 104) in response to requests for the structured document 110 made from within the region 120.

As will be described in greater detail below with regard to FIG. 2, the edits 112 are also expressed using a language independent data format, such as JSON or any of the other formats identified above. In one configuration, the edits 112 include data to be stored in the structured document 110 along with other data that identifies a field in the structured document 110 in which the data is to be stored. As will be discussed in greater detail below with regard to FIG. 2, the edits 112 might also include a document identifier ("ID") identifying the document 110 to which the edits 112 pertain. The edits 112 might also include data that can be utilized to sort the edits 112 such as, but not limited to, a time stamp and/or a region-based counter value. The edits 112 can also include constraints. The constraints can be used to define various conditions that must be satisfied in order for the edits 112 to be applied to the structured document 110. Additional details regarding these attributes will be provided below with regard to FIG. 2.

As discussed above, the document management service 102 can receive requests for the structured document 110. For example, a user might request to view the structured document 110 in the user interface 104. In order to fulfill such a request, the document management service 102 must first use the edits 112 to generate the structured document 110. In particular, the document management service 102 will obtain all of the edits 112 for the structured document 110. The document management service 102 will then sort the edits 112 based upon their creation date/time and/or other time-based attributes.

Once the edits 112 have been sorted, the edits 112 are "replayed" in sorted order to generate the document 110. More particularly, the edits 112 are processed in the order in which they were created, and the data from the edits 112 is stored in the document 110 in the field specified by the edits 112. If data is stored in a field of the document 110 by a previous edit 112, a later edit 112 to the same field will overwrite the contents of that field in the document 110. By performing edits 112 on a field-by-field basis, and by giving priority to later made edits 112 to the same field of the document 110, no conflict resolution process is necessary. In this regard, it should be appreciated that the state of the document 110 can be generated at any point in time by utilizing only those edits 112 made prior to that point in time when generating the document 110. Additional details regarding this process are provided below with regard to FIGS. 2 and 3.

It should be appreciated that the various components illustrated in FIG. 1 can be implemented within a service provider network (not shown in FIG. 1). A service provider network is a distributed network through which customers and/or other users can utilize computing resources (which might be referred to herein as "resources"), such as virtual machine instances and/or other types of computing resources and network services, on a permanent or as-needed basis. Additional details regarding one implementation of a service provider network and the various types of network services that might be provided by the service provider network will be discussed below with regard to FIGS. 6-9. It should be appreciated that while the implementations disclosed herein are presented primarily in the context of software components executing in a service provider network, the technologies disclosed herein might also be implemented in other environments.

Figure 2:
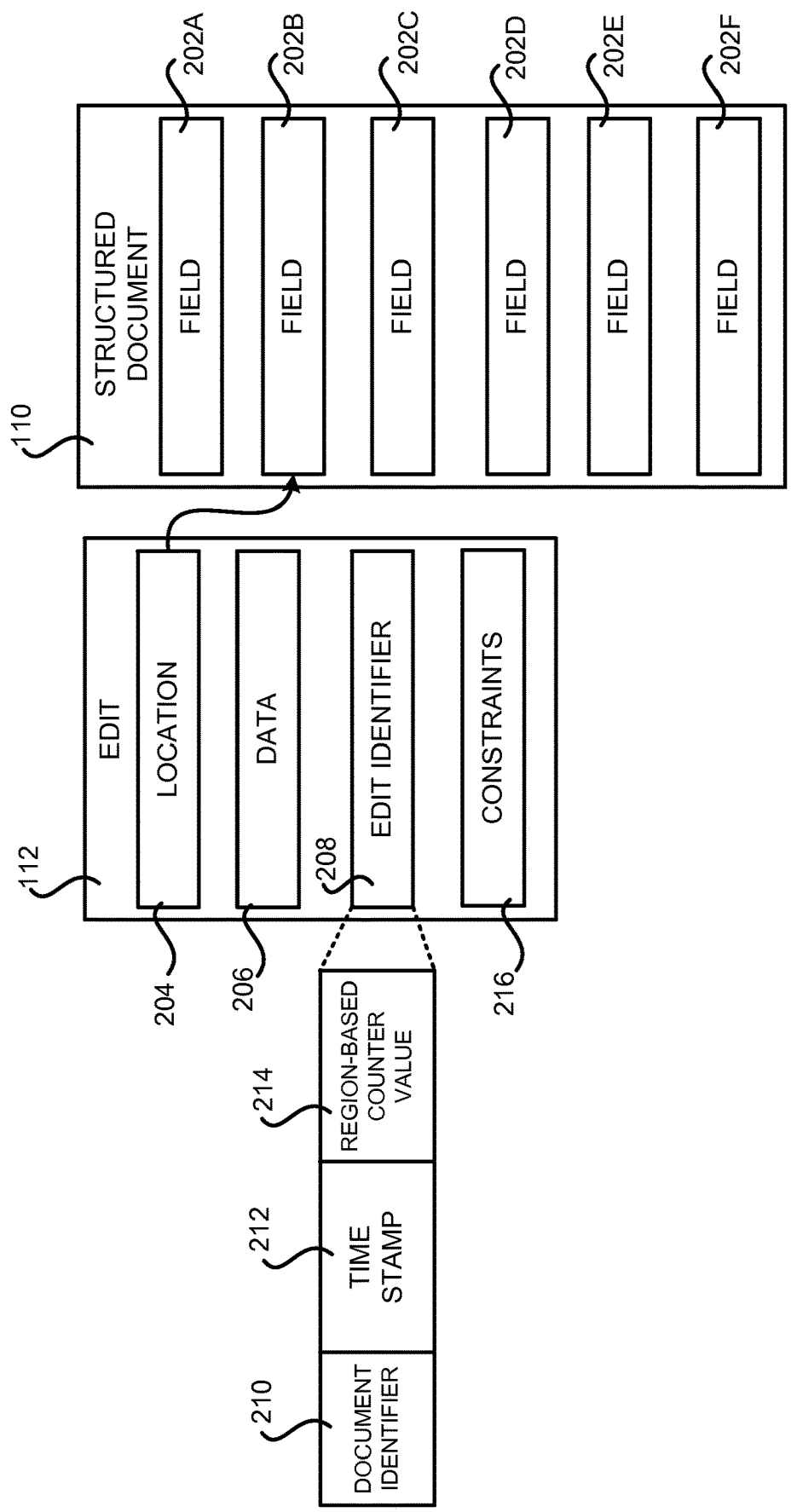
FIG. 2 is a data structure diagram showing aspects of a structured document, such as a trouble ticket, and an edit to a structured document in one particular configuration disclosed herein.

FIG. 2 is a data structure diagram showing aspects of the structured document 110 and an edit 112 to the structured document 110 in one particular configuration disclosed herein. As shown in FIG. 2 and discussed briefly above, the structured document 110 can be defined to include a number of fields 202A-202F (collectively, the fields 202). The fields 202 can be utilized to store various types of data. For example, when the document 110 is a trouble ticket, the fields 202 can be utilized to store information like the creation date for the trouble ticket, the date on which an issue associated with the trouble ticket was resolved, a description of the issue associated with the trouble ticket, the identity of one or more users to which the trouble ticket has been assigned, and/or other types of information relating to the trouble ticket. The fields 202 of the structured document 110 can be utilized to store other types of information in other configurations. In this regard, it should be appreciated that although a flat field structure is illustrated in FIG. 2, the structured document 110 might be defined such that it has a hierarchy of fields 202 in other configurations.

As also illustrated in FIG. 2 and described briefly above, each edit 112 includes data 206 to be stored in a field 202 of the structured document 110. The edit 112 also specifies a location 204 for the data 206. For instance, in the example shown in FIG. 2, the location 204 specifies that the data 206 is to be stored in the field 202B. In this regard, it should be appreciated that while only data 206 for a single field 202B is illustrated in FIG. 2, one edit 112 might define the contents of multiple fields 202 in a similar manner.

As also shown in FIG. 2, each edit 112 includes an edit identifier ("ID") 208. In one configuration, the edit ID 208 specifies a document ID 210 that uniquely identifies the structured document 110 to which the edit 112 applies. The edit ID 208 might also specify a time stamp 212. The time stamp 212 specifies the date and time at which the edit 112 was created. As described below in further detail, the time stamp 212 can be utilized when sorting edits 112 that were made in different geographic regions 120.

In one configuration, the edit ID 208 also includes a region-based counter value 214. The region-based counter value 214 is a per-region 120 monotonically increasing value that is assigned to edits 112. In one configuration, the database service 114 assigns the region-based counter value 214 to the edits 112. However, other components might be configured to generate and assign the region-based counter value 214 to edits 112. Through the use of the region-based counter value 214, each edit 112 that is generated within a region 120 is assigned a unique identifier that can be utilized to sort the edits 112 into the order in which they were created. By assigning a monotonically increasing value to the edits 112 in this way, it is not possible for two edits 112 to be assigned the same ID as would be the case if the edits 112 were sorted by time of creation only. Additional details regarding the usage of the time stamp 212 and the region-based counter value 214 to sort edits 112 will be provided below with regard to FIG. 3.

As also shown in FIG. 2, an edit 112 can specify one or more constraints 116 in one configuration. As discussed above, the constraints 116 can be used to define various conditions that must be satisfied in order for the edit 112 to be applied to the structured document 110. For example, and without limitation, the constraints 116 might specify that the field 202D (or any other field 202, or fields) contain (or not contain) a particular value. If the specified constraints 216 are not satisfied, then the data 206 will not be stored in the specified location 204 in the structure document 110. Other types of constraints 216 might be specified in a similar fashion. It should be appreciated that the structure of the structured document 110 and the edit 112 shown in FIG. 2 is merely illustrative and that these data structures might include fewer, more, or different fields than shown in FIG. 2.

Figure 3:
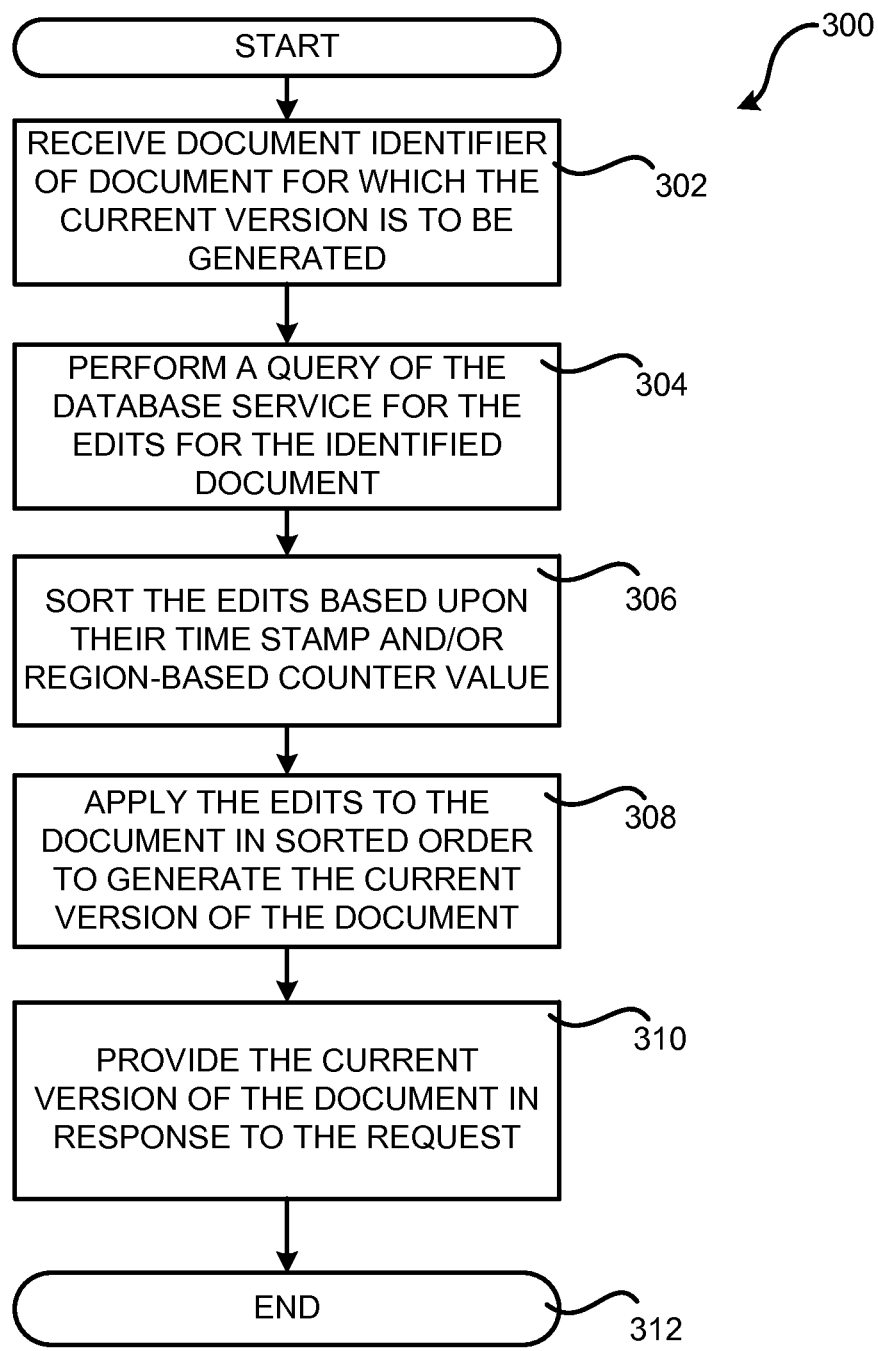
FIG. 3 is a flow diagram showing aspects of an illustrative routine for generating a current version of a structured document based upon edits to the document, according to one embodiment disclosed herein.

FIG. 3 is a flow diagram showing aspects of an illustrative routine 300 disclosed herein for generating a current version of a structured document 110 based upon edits 112 to the structured document 110, according to one embodiment disclosed herein. It should be appreciated that the logical operations described herein with respect to FIG. 3, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations might also be performed by components other than those specifically identified.

The routine 300 begins at operation 302, where a document ID is received for the structured document 110 that is to be generated. For instance, a user might request that a particular structured document 110 be generated through the user interface 104. Similarly, a request might be received for a structured document 110 through the API 106 that specifies the document ID for the structured document 110. The document ID assigned to the structured document 110 to be generated might also be received in other ways.

From operation 302, the routine 300 proceeds to operation 304, where the document management service 102 performs a query of the database service 114 for the edits 112 associated with the structured document 110 that is to be generated (i.e. the edits 112 associated with the structured document 110 having the document ID received at operation 302).

The routine 300 then proceeds from operation 304 to operation 306, where the edits 112 for the structure document 110 to be generated are sorted based upon the time at which they were created. As discussed briefly above, edits 112 made in the same region 120 as the instance of the document management service 102 that is generating the requested document 110 can be sorted using the region-based counter value 214. Document edits 112 that were created in another region 120 cannot, however, be sorted based upon the region-based counter value 214 because counter values are assigned to edits 112 on a per-region basis. Consequently, edits 112 created in another region are sorted based upon their associated time stamp 212. In order to ensure that time stamps 212 generated by systems in the different regions 120 are synchronized, a network time protocol ("NTP") or another mechanism can be utilized to synchronize the real time clocks of the various systems described herein.

It should be appreciated that the operations 304 and 306 might be performed utilizing a single query operation in some configurations. For example, and without limitation, a query can be defined that causes the database service 114 to not only retrieve the edits 112 for the structured document 110 to be generated, but that also sorts the edits 112 in the manner described above. In this way, the relevant edits 112 can be received from the database service 114 in sorted order. In order to enable this functionality, the edits 112 can be stored in rows in a database table in encrypted or unencrypted form. The primary key of each row is the document identifier. The secondary key is the edit ID 208 for the edit 112. When a query is generated for an edit 112, a search is made using the primary key and sorted using the secondary key (e.g. the time stamp and region-based counter value). Other configurations might also be utilized.

Once the edits 112 have been sorted, the routine 300 proceeds from operation 306 to operation 308. At operation 308, the edits 112 are applied to the structured document 110 in the sorted order. In this way, earlier created edits 112 are applied to the structured document 110 before later created edits 112. Additionally, if data has been stored in a field 202 of the structured document 110 by a previous edit 112, a later edit 112 to the same field 202 will overwrite the contents of that field in the document 110. As mentioned above, by applying edits 112 to the structured document 110 on a field-by-field basis, and by giving priority to later made edits 112 to the same field 202 of the structured document 110 in this manner, no conflict resolution process is necessary.

Any constraints 216 specified in the edits 112 for the structured document 110 are also evaluated at operation 308. If the constraints 216 for an edit 112 are satisfied, then the edit 112 is applied to the structured document 110. If the constraints 116 are not satisfied, then the edit 112 is not applied to the structured document 110.

From operation 308, the routine 300 proceeds to operation 310, where the structured document 110 generated at operation 308 is provided in response to the request received at operation 302. For instance, the structured document 110 might be presented to a user in the user interface 104. Alternately, the structured document 110 might also be provided in response to a request for the structured document 110 received through the API 106. The routine 300 then proceeds from operation 312, where it ends.

It should be appreciated that although the routine 300 described above is presented as generating the document 110 at a "current" time, the document 110 can be generated in a manner that reflects its contents at any point in time following its creation. In order to generate the document 110 as of a particular point in time, only the edits 112 made to the document 110 prior to that point in time are applied to the document 110.

It should also be appreciated that the amount of time required to perform the process described above can be optimized by caching a generated document 110 in some configurations. When a subsequent request is received to generate the same document 110, only those edits 112 made to the document 110 after the time at which the document 110 was previously generated need to be applied to the cached version of the document 110 in order to arrive at the current version of the document 110. Other caching mechanisms might also be utilized.

Figure 4:
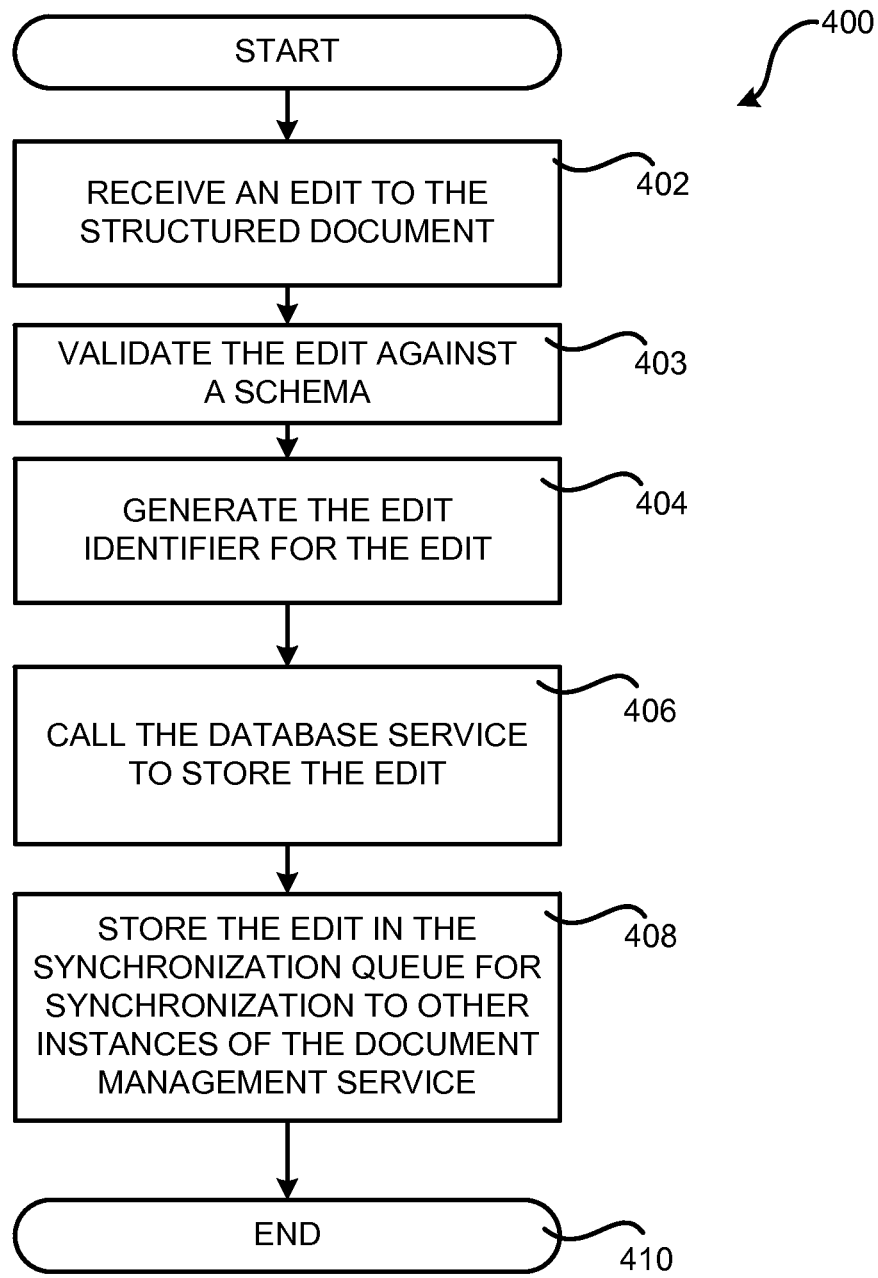
FIG. 4 is a flow diagram showing aspects of an illustrative routine for processing edits made to a structured document in one configuration disclosed herein.

FIG. 4 is a flow diagram showing aspects of an illustrative routine 400 disclosed herein for processing edits 112 made to a structured document 110 in one configuration disclosed herein. The routine 400 begins at operation 402, where the document management service 102 receives an edit 112 to a structured document 110. As discussed above, an edit 112 can include data 206 to be stored in the structured document 110, along with other data that identifies the location 204 within the structured document 110 (e.g. a field 202) at which the data 206 is to be stored. The edit 112 can also include other types of data such as, but not limited to, the constraints 216 described above.

From operation 402, the routine 400 proceeds to operation 403 where the received edit 112 is validated against a pre-defined schema. If the edit 112 cannot be validated against the schema, the edit 112 can be rejected. If the edit 112 can be validated against the scheme, the routine 400 proceeds from operation 403 to operation 404, where the edit ID 208 is generated for the edit 112 received at operation 402. As discussed above, the edit ID 208 can include a document ID 210 that identifies the structured document 110, a time stamp 212 indicating the date and time the edit 112 was created, and a region-based counter value 214. As also discussed above, the region-based counter value 214 is supplied by the database service 114 in some configurations. The time stamp 212 can also be supplied by the database service 114.

From operation 404, the routine 400 proceeds to operation 406, where the document management service 102 calls the database service 114 to store the edit 112 that was created at operations 402 and 404. The routine 400 then proceeds from operation 406 to operation 408, where the document management service 102 stores the newly created edit 112 in the synchronization queue 116 for synchronization to other instances of the document management service 102 executing in other geographic regions 120. In this regard, it should be appreciated that edits 112 can continue to be made and placed on the synchronization queue 116 even when a network connection cannot be established to the instances of the synchronization service 118 to which the edits 112 are to be synchronized. In this way, the loss of a network connection between the instances of the synchronization service 118 operating in the various regions 120 will not result in the loss of any data. Rather, all of the edits 112 will be synchronized between the regions 120 when the data connection is restored. Additional details regarding the synchronization process will be provided below with regard to FIG. 5. From operation 408, the routine 400 proceeds to operation 410, where it ends.

Figure 5:
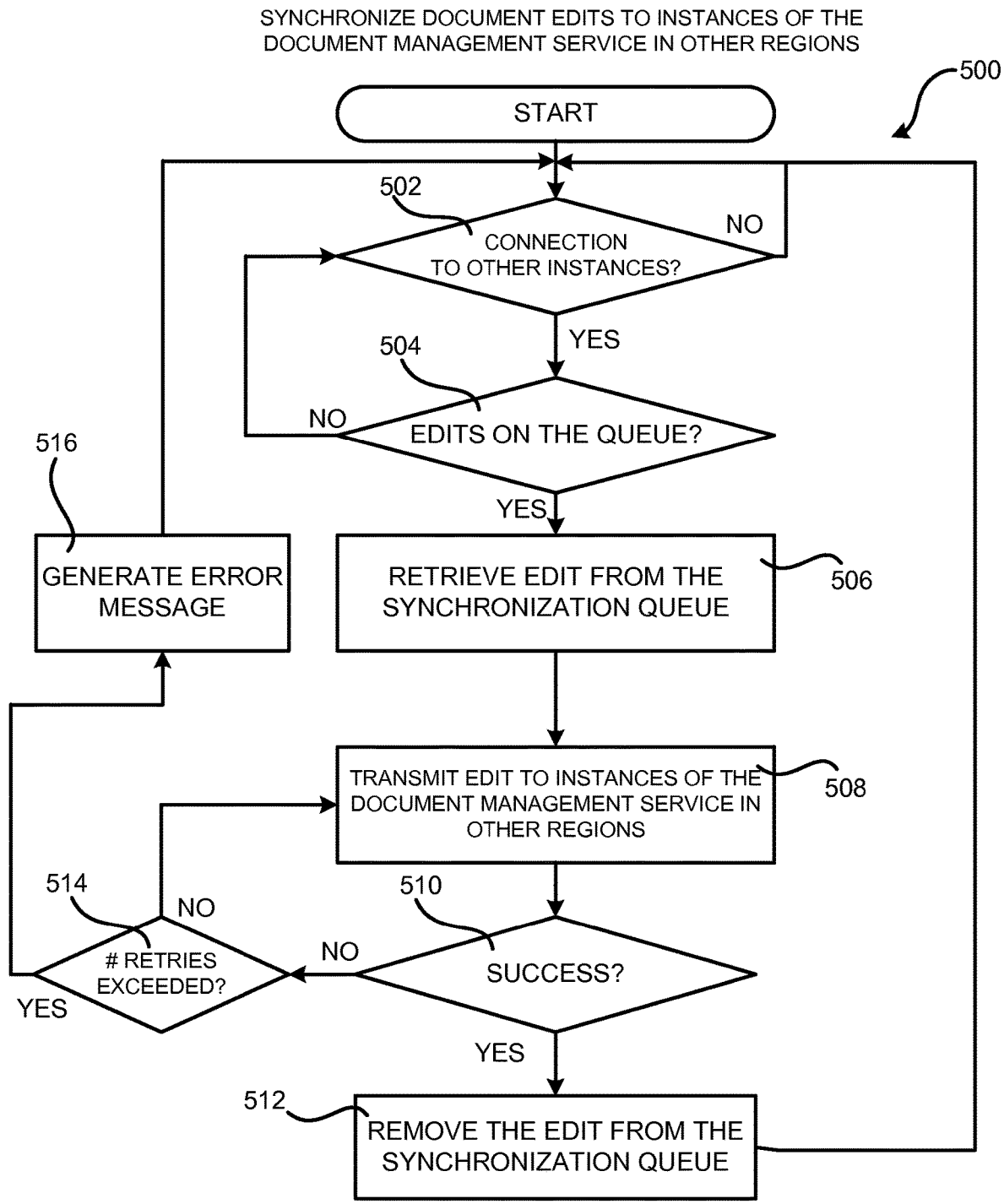
FIG. 5 is a flow diagram showing aspects of an illustrative routine for asynchronously synchronizing document edits to instances of a document management service operating in different geographic regions, according to one configuration disclosed herein.

FIG. 5 is a flow diagram showing aspects of an illustrative routine 500 disclosed herein for synchronizing document edits 112 to instances of the document management service 102 operating in different geographic regions 120, such as the regions 120B and 120C, according to one configuration disclosed herein. The routine 500 begins at operation 502, where an instance of the synchronization service 118A determines whether a network connection is available to the other instances of the synchronization service 118 to which edits 112 are to be synchronized. If no network connection is available, the routine 500 proceeds back to operation 502 where another such determination can be made. Additionally, error messages or other types of alerts can be generated in order to notify an administrator that network connectivity has been lost. If a network connection is available to the other instances of the synchronization service 118 to which edits 112 are to be synchronized, the routine 500 proceeds from operation 502 to operation 504.

At operation 504, the instance of the synchronization service 118A determines whether there are any edits 112 on the synchronization queue 116 awaiting synchronization to the other instances of the synchronization service 118. If there are no edits 112 on the synchronization queue 116, the routine 500 proceeds back to operation 502. If, however, there are edits 112 on the synchronization queue 116, the routine 500 proceeds from operation 504 to operation 506.

At operation 506, the instance of the synchronization service 118A retrieves an edit 112 from the synchronization queue 116. The routine 500 then proceeds to operation 508, where the instance of the synchronization service 118A transmits the edit 112 to instances of the synchronization service 118 located in the other geographic regions, such as the geographic regions 120B and 120C shown in FIG. 1. The instance of the synchronization service 118A then determines if the transmitted edit 112 was successfully received by the other instances of the synchronization service 118.

If the transmitted edit 112 was successfully received by the other instances of the synchronization service 118, the routine 500 proceeds from operation 510 to operation 512. At operation 512, the instance of the synchronization service 118A removes the transmitted edit 112 from the synchronization queue 116. The routine 500 then proceeds back to operation 502, where another edit 112 can be transmitted in a similar manner.

If the transmitted edit 112 is not successfully received by the other instances of the synchronization service 118, the routine 500 proceeds from operation 510 to operation 514. At operation 514, the instance of the synchronization service 118A determines whether a specified number of transmission retries has been exceeded. If the number of retries has not been exceeded, the routine 500 proceeds from operation 514 to operation 508, where another attempt is made to transmit the edit 112 to the other instances of the synchronization service 118.

If the number of retries has been exceeded, the routine 500 proceeds from operation 514 to operation 516, where an error message or other type of alert might be generated to an administrator indicating that transmission of an edit 112 has failed. The routine 500 then proceeds back to operation 502, where other edits 112 might be synchronized to other instances of the synchronization service 118 located in other regions 120. It should be appreciated that the transmission of an edit 112 to the instances of the synchronization service 118 in other regions can be retried indefinitely.

It should be appreciated that the instances of the synchronization service 118 located in the other geographic regions 120 perform synchronization of edits 112 made in those regions in a similar fashion. In this way, all of the edits made in all of the regions 120 are present and available in each of the regions 120 for use in generating a document 110 as described above. It should be further appreciated that, although not illustrated in FIG. 5, each instance of the synchronization service 118 is also configured to receive edits 112 from other instances of the synchronization service 118 and to store the received edits 112 in an appropriate location, such as through the use of the database service 114 in one particular configuration.

It should also be appreciated that it is not necessary for edits 112 to be synchronized in the order in which they were created since each edit 112 includes a time stamp 212 and a region-based counter value 214 that define the order in which the edits 112 were made to the document 110. In this regard, it should be further appreciated that all of the edits 112 might not actually be completely synchronized between the regions 120 at any given point in time. This does not, however, impact the ability of the document management service 102 to generate a current version of a document at any point in time. For example, if edits 112 to a document have not yet been received, or are never received at a region, the non-received edits 112 are simply ignored when generating the document. This fact presents benefits over other systems wherein edits within a document are dependent upon one another. In these systems, it would not be possible to generate the document if any of the edits to the document were unavailable. Consequently, however, the document management service described herein might be unsuitable for storing certain types of documents, such as legal documents, where the possibility of a lost edit to a document is unacceptable. Other benefits of the technologies disclosed herein will be apparent from a reading of the detailed description presented above.

Figure 6:
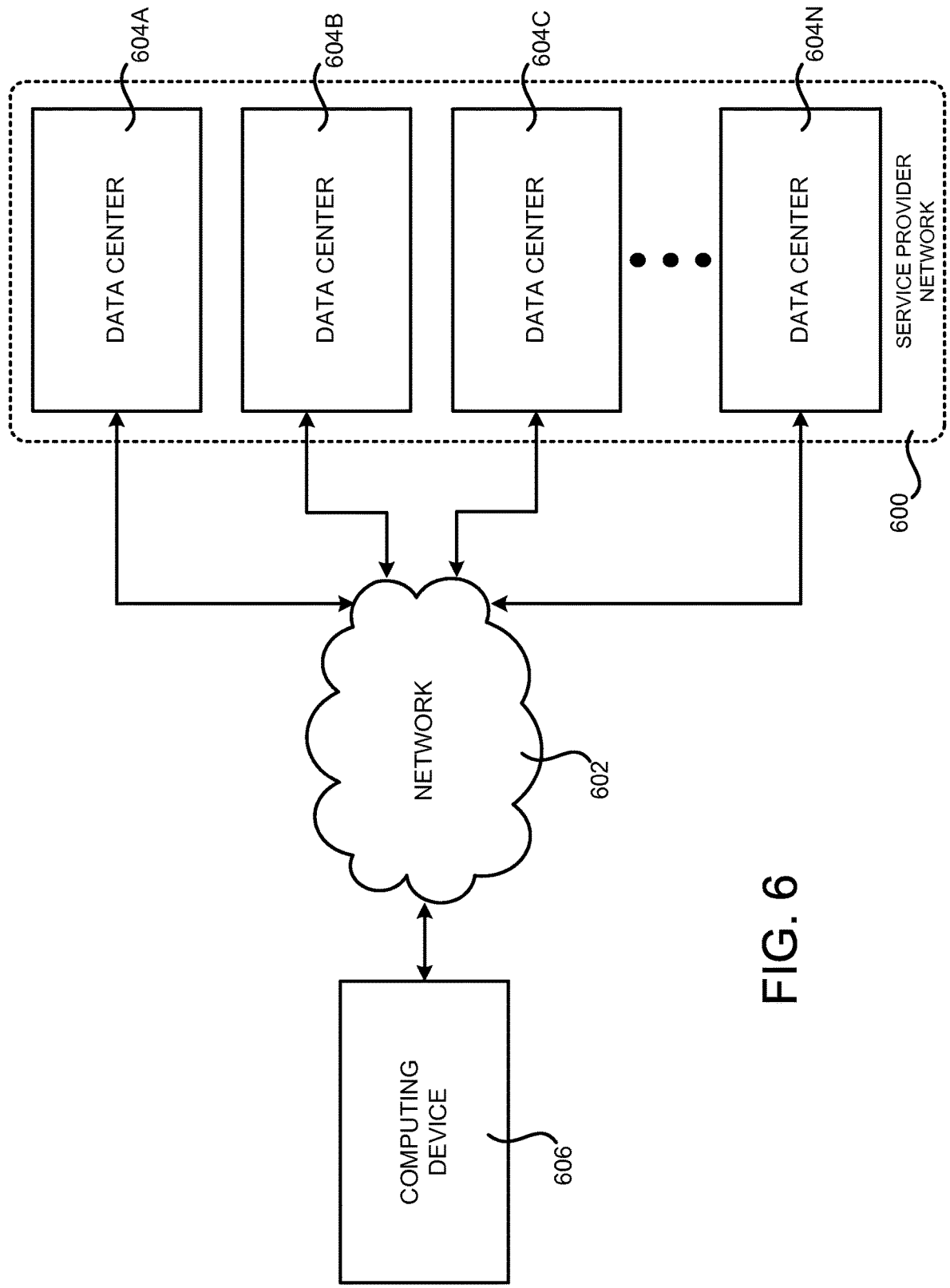
FIG. 6 is a system and network diagram that shows an illustrative operating environment that includes a service provider network that can be configured to implement aspects of the functionality described herein.

FIG. 6 is a system and network diagram that shows one illustrative operating environment for the configurations disclosed herein that includes a service provider network 600 that can be configured to provide functionality for distributed asynchronous document editing in the manner described above. The service provider network 600 can provide computing resources on a permanent or an as-needed basis. Among other types of functionality, the computing resources provided by the service provider network 600 can be utilized to execute the various services and other software components described above. The computing resources provided by the service provider network 600 can include various types of computing resources, such as data processing resources, data storage resources, networking resources, data communication resources, network services, and the like.

Each type of computing resource provided by the service provider network 600 might be general-purpose or might be available in a number of specific configurations. For example, data processing resources can be available as physical computers or virtual machine instances in a number of different configurations. The virtual machine instances can be configured to execute applications, including web servers, application servers, media servers, database servers, some or all of the services described above, and/or other types of programs. Data storage resources can include file storage devices, block storage devices, and the like. The service provider network 600 might also be configured to provide other types of resources and network services.

The computing resources provided by the service provider network 600 are enabled in one implementation by one or more data centers 604A-604N (which might be referred herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 might also be located in geographically disparate locations. One illustrative configuration for a data center 604 that implements some of the technologies disclosed herein for distributed asynchronous document editing will be described below with regard to FIG. 7.

The customers and other users of the service provider network 600 can access the computing resources provided by the service provider network 600 over a network 602, which can be a wide area communication network ("WAN"), such as the Internet, an intranet or an Internet service provider ("ISP") network or a combination of such networks. For example, and without limitation, a computing device 606 operated by a customer or other user of the service provider network 600 (e.g. users of the document management service 102) might be utilized to access the service provider network 600 by way of the network 602. It should be appreciated that a local-area network ("LAN"), the Internet, or any other networking topology known in the art that connects the data centers 604 to remote customers and other users can be utilized. It should also be appreciated that combinations of such networks might also be utilized.

Figure 7:
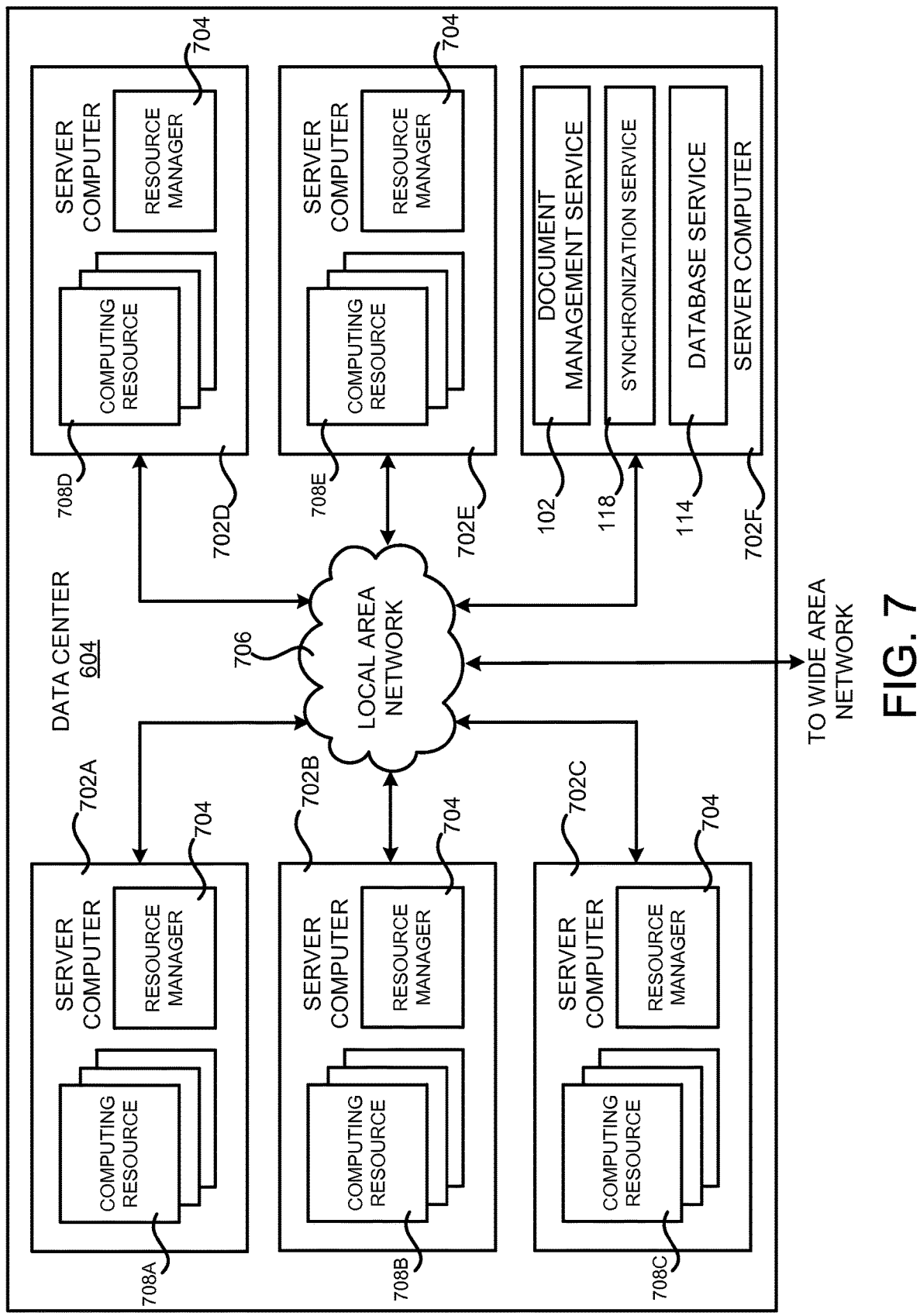
FIG. 7 is a computing system diagram that illustrates a configuration for a data center that can be utilized to implement aspects of the technologies disclosed herein.

FIG. 7 is a computing system diagram that illustrates one configuration for a data center 604 that implements aspects of the concepts and technologies disclosed herein distributed asynchronous document editing. The example data center 604 shown in FIG. 7 includes several server computers 702A-702F (which might be referred to herein singularly as "a server computer 702" or in the plural as "the server computers 702") for providing computing resources 708A-708E, respectively.

The server computers 702 can be standard tower, rackmount, or blade server computers configured appropriately for providing the computing resources described herein. As mentioned above, the computing resources might be data processing resources such as virtual machine instances or hardware computing systems, data storage resources, database resources, networking resources, and others. Some of the servers 702 might also be configured to execute a resource manager 704 capable of instantiating and/or managing the computing resources. In the case of virtual machine instances, for example, the resource manager 704 might be a hypervisor or another type of program configured to enable the execution of multiple virtual machine instances on a single server 702. Server computers 702 in the data center 604 might also be configured to provide network services and other types of services, some of which are described in detail below with regard to FIG. 8.

The data center 604 shown in FIG. 7 also includes a server computer 702F that can execute some or all of the software components described above. For example, and without limitation, the server computer 702F might be configured to execute one or more of the document management service 102, the synchronization service 118, and/or the database service 114, each of which has been described in detail above. The server computer 702F might also be configured to execute other components and/or to store data for providing some or all of the functionality described herein. In this regard, it should be appreciated that the network services illustrated in FIG. 7 as executing on the server computer 702F might execute on many other physical or virtual servers in the data centers 604 in various configurations.

In the example data center 604 shown in FIG. 7, an appropriate LAN 706 is also utilized to interconnect the server computers 702A-702F. The LAN 706 is also connected to the network 602 illustrated in FIG. 6. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components might also be utilized for balancing a load between each of the data centers 604A-604N, between each of the server computers 702A-702F in each data center 604, and, potentially, between computing resources in each of the data centers 604. It should be appreciated that the configuration of the data center 604 described with reference to FIG. 7 is merely illustrative and that other implementations might be utilized.

Figure 8:
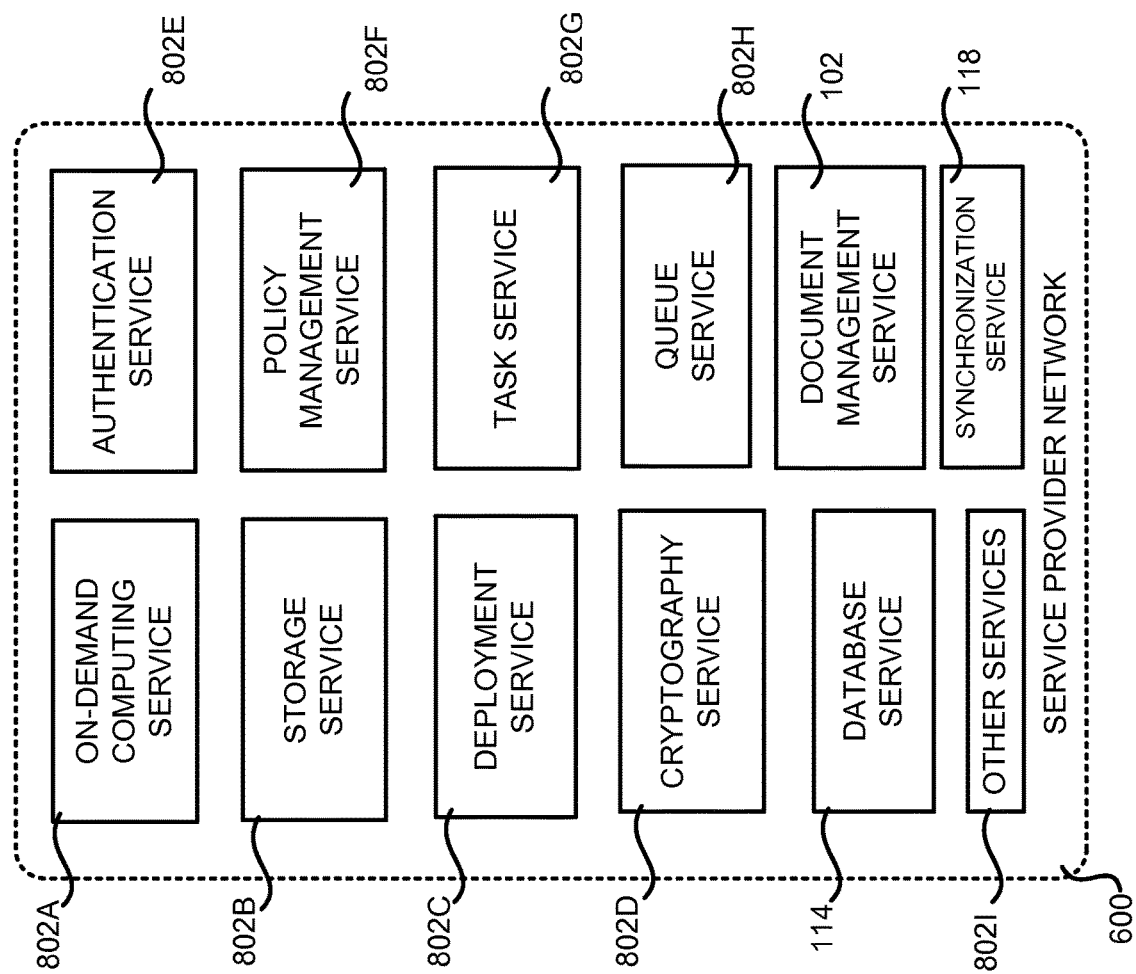
FIG. 8 is a system and network diagram that shows aspects of several services that might be provided by and utilized within a service provider network in one configuration disclosed herein.

FIG. 8 is a system and network diagram that shows aspects of several network services that might be implemented within the service provider network 600 and utilized to implement aspects of the functionality disclosed herein in various configurations. In particular, and as discussed briefly above, the service provider network 600 can provide a variety of network services to customers and other users of the service provider network 600 including, but not limited to, an on-demand computing service 802A, a storage service 802B, a deployment service 802C, a cryptography service 802D, an authentication service 802E, a policy management service 802F, task service 802G, and/or a queue service 802H, each of which is described in greater detail below. Additionally, the service provider network 600 might also provide the document management service 102, the database service 114, and/or the synchronization service 118, each of which was described in detail above. The service provider network 600 might also provide other services 802I, some of which are described below.

It is noted that not all configurations described include the services described with reference to FIG. 8 and that additional services can be provided in addition to or as an alternative to services explicitly described. Each of the services shown in FIG. 8 might also expose web service APIs and/or other types of interfaces that enable a caller to submit appropriately configured requests to the various services. In addition, each of the illustrated services can include service interfaces that enable the services to access each other (e.g., to enable a virtual computer system provided by the on-demand computing service 802A to store data in or retrieve data from the data storage service 802B). Additional details regarding some of the services shown in FIG. 8 will now be provided.

The on-demand computing service 802A can be a collection of computing resources configured to instantiate virtual machine instances. For example, a customer or other user of the service provider network 802A can interact with the on-demand computing service 802A (via appropriately configured and authenticated API calls or other interfaces) to provision and operate virtual computer systems that are instantiated on physical computing devices hosted and operated by the service provider network 600.

The virtual computer systems provided by the on-demand computing service 802A can be used for various purposes, such as to implement the various services described herein, to operate as servers supporting a website, to operate business applications or, generally, to serve as computing resources for the customer. Other applications for the virtual computer systems can be to support database applications, electronic commerce applications, business applications and/or other applications. Although the on-demand computing service 802A is shown in FIG. 8 and described in detail above, it should be appreciated that other computer systems or computer system services can be utilized in the service provider network 600 (or another type of network) to implement the functionality disclosed herein such as, but not limited to, a computer system or computer system service that does not employ virtualization and instead provisions computing resources on dedicated or shared computers/servers and/or other physical devices.

The storage service 802B might include software and computing resources that collectively operate to store data using block or file-level storage devices (and/or virtualizations thereof). The storage devices of the storage service 802B might, for instance, be operationally attached to virtual computer systems provided by the on-demand computing service 802A to serve as logical units (e.g., virtual drives) for the computer systems. A storage device might also enable the persistent storage of data used/generated by a corresponding virtual computer system, where the virtual computer system service might only provide ephemeral data storage.

The service provider network 600 can also include a cryptography service 802D. The cryptography service 802D can utilize storage services of the service provider network 600, such as the storage service 802B, to store encryption keys in encrypted form. The encryption keys can be usable to decrypt customer keys accessible only to particular devices of the cryptography service 802D. The cryptography service 802D might also provide other types of functionality for performing other types of cryptographic operations not specifically mentioned herein.

As illustrated in FIG. 8, the service provider network 600, in various configurations, also includes an authentication service 802E and a policy management service 802F. The authentication service 802E, in one example, is a computer system (i.e., collection of virtual or physical computing resources) configured to perform operations involved in authentication of users. For instance, one of the services 802 shown in FIG. 8 can provide information from a user to the authentication service 802E to receive information in return that indicates whether or not the requests submitted by the user are authentic.

The policy management service 802F, in one example, is a network service configured to manage policies on behalf of customers or internal users of the service provider network 600. The policy management service 802F can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 600, in various configurations, is also configured with a task service 802G. The task service 802G is configured to receive a task package and to enable executing tasks as dictated by the task package. The task service 802G can be configured to use any resource of the service provider network 600, such as instantiated virtual machines or virtual hosts, for executing the task. The task service 802G can configure the instantiated virtual machines or virtual hosts to operate using a selected operating system and/or a selected execution application in accordance with specified requirements.

The service provider network 600 might also maintain a queue service 802H. The queue service 802H provides functionality for allowing users to define one or more queues, such as the synchronization queue 116, and for retrieving and deleting items from the queues. The queue service 802H might also provide other types of functionality not specifically mentioned herein.

The service provider network 600 can additionally maintain other services 802 based, at least in part, on the needs of its customers. For instance, the service provider network 600 can maintain a deployment service 802C for deploying program code, the database service 114, and/or the synchronization service 118 in some configurations. As discussed above, the database service 114 can be implemented as a collection of computing resources that collectively operate to create, maintain, and allow queries to be performed on databases stored within the service provider network 600. For example, a customer or other user of the service provider network 600 can operate and manage a database, such as the database 108, from the database service 114 by utilizing appropriately configured network API calls. This, in turn, can allow the customer to maintain and potentially scale the operations in the database. Other services include object-level archival data storage services, and services that manage, monitor, interact with, or support other services. The service provider network 600 might also be configured with other services not specifically mentioned herein in other configurations.

Figure 9:
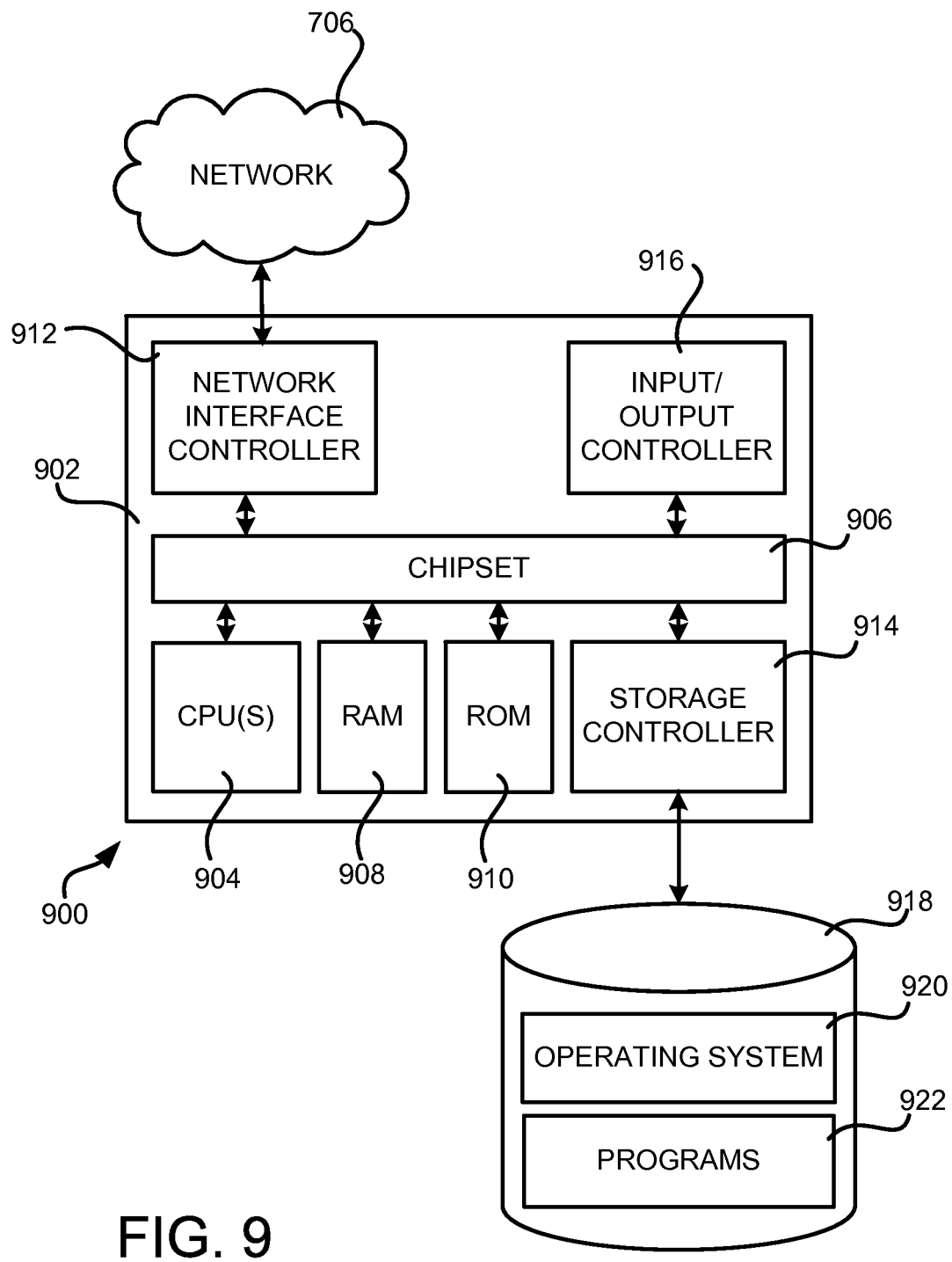
FIG. 9 is a computer architecture diagram showing an illustrative computer hardware architecture for implementing a computing device that might be utilized to implement aspects of the various technologies presented herein.

FIG. 9 shows an example computer architecture for a computer 900 capable of executing program components for implementing various aspects of the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 806. The chipset 906 can include functionality for providing network connectivity through a NIC 912, such as a gigabit Ethernet adapter. The NIC 912 is capable of connecting the computer 900 to other computing devices over the network 706. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state might depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 might have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to one configuration, the operating system comprises the LINUX operating system. According to another configuration, the operating system comprises the WINDOWS® SERVER operating system from MICROSOFT Corporation. According to further configurations, the operating system might comprise the UNIX operating system or one of its variants. It should be appreciated that other operating systems can also be utilized. The mass storage device 918 can store other system or application programs and data utilized by the computer 900.

In one configuration, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various processes described above with regard to FIGS. 1-5. The computer 900 might also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, a plotter, or other type of output device. It will be appreciated that the computer 900 might not include all of the components shown in FIG. 9, can include other components that are not explicitly shown in FIG. 9, or might utilize an architecture completely different than that shown in FIG. 9.

Based on the foregoing, it should be appreciated that technologies for distributed asynchronous document editing have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system for distributed asynchronous editing of a trouble ticket, the apparatus comprising:
   one or more processors; and
   at least one non-transitory computer-readable storage medium having instructions executable by the one or more processors stored thereupon which, when executed, cause the system to
      receive, at a first instance of a trouble ticket management service executing in a first data center of a service provider network that is located in a first geographic region, first edits to the trouble ticket, the first edits comprising data to be stored in the trouble ticket and identifying a field in the trouble ticket in which the data is to be stored, wherein the first data center includes a plurality of first computing devices that host the first instance of the ticket management service, a first synchronization service, and a database service,
      store the first edits to the trouble ticket utilizing the database service executing in the first data center of the service provider network that is located in the first geographic region,
      transmit, from the first synchronization service executing in the first data center of the service provider network that is located in the first geographic region and associated with the first instance of the trouble ticket management service, the first edits to the trouble ticket to one or more other synchronization services executing in one or more different data centers of the service provider network that are located in one or more other geographic regions and associated with one or more other instances of the trouble ticket management service executing in the one or more different data centers of the service provider network that are located in the one or more other geographic regions, wherein the one or more other data centers include a plurality of other computing devices that host the one or more other instances of the ticket management service, and the one or more other synchronization services, receive second edits to the trouble ticket from the one or more other synchronization services associated with the one or more other instances of the trouble ticket management service executing in the one or more different data centers of the service provider network that are located in the one or more other geographic regions of the service provider network, store the second edits to the trouble ticket received from the one or more other synchronization services associated with the one or more other instances of the trouble ticket management service utilizing the database service, sort edits, that include the first edits and the second edits, into a sorted order based at least in part on a first region-based counter value associated with the first edits and a second region-based counter value associated with the second edits;

receive a request for the trouble ticket, and generate the trouble ticket based, at least in part on the sorted order, and storing the data in the edits in the fields of the trouble ticket in the sorted order, wherein at least one of the edits further comprises one or more constraints, and wherein the data in the at least one of the edits is not utilized during generation of the trouble ticket if the one or more constraints are not satisfied.

2. The system of claim 1, wherein the edits further comprise an edit identifier (ID), the edit ID comprising a time stamp associated with the creation of an edit and a region-based counter value associated with an edit.

3. The system of claim 2, wherein the edits are sorted based at least in part upon the edit ID.

4. The system of claim 1, wherein the first synchronization service is configured to store the edits to the trouble ticket received from the one or more other synchronization services associated with the one or more other instances of the trouble ticket management service utilizing the database service.

5. The system of claim 1, wherein the trouble ticket management service exposes a web service application programming interface (API) for receiving the edits to the trouble ticket.

6. The system of claim 1, wherein the trouble ticket management service exposes a web service application programming interface (API) for obtaining the edits to the trouble ticket.

7. A non-transitory computer-readable storage medium having computer-executable instructions stored thereupon which, when executed by a computer, cause the computer to:

receive first edits to a structured document at a first instance of a document management service that is executing in a first data center of a service provider network that is located in a first geographic region, the first edits comprising data to be stored in the structured document and identifying a field in the structured document in which the data is to be stored;

transmit, from a first synchronization service executing in the first data center of the service provider network that is located in the first geographic region and associated with the first instance of the document management service, the first edits to the structured document to a second synchronization service executing in a second data center of the service provider network that is located in a second geographic region and associated with a second instance of the document management service executing in the second data center;

receive second edits to the structured document from the second synchronization service associated with the one or more other instances of the document management service;

sort edits, that include the first edits and the second edits, into a sorted order based at least in part on a first region-based counter value associated with the first edits and a second region-based counter value associated with the second edits;

receive a request for the structured document; and generate the structured document based, at least in part on the sorted order, and storing the data from the edits in the fields of the structured document in the sorted order, wherein at least one of the edits further comprises one or more constraints, and wherein the data in the at least one of the edits is not utilized during generation of the structured document if the one or more constraints are not satisfied.

8. The non-transitory computer-readable storage medium of claim 7, wherein the first synchronization service is configured to store the first edits to the structured document utilizing a database service.

9. The non-transitory computer-readable storage medium of claim 7, wherein the document management service, and a database service is configured to store the first edits to the structured document received at the first instance of a document management service and the second edits to the structured document received from the one or more other instances of the document management service.

10. The non-transitory computer-readable storage medium of claim 7, wherein the first region-based counter value tracks a number of writes.

11. The non-transitory computer-readable storage medium of claim 7, wherein the structured document comprises a trouble ticket expressed using text that identifies one or more objects that include one or more properties.

12. The non-transitory computer-readable storage medium of claim 7, wherein the document management service exposes a web service application programming interface (API) for receiving the edits to the structured document.

13. The non-transitory computer-readable storage medium of claim 7, wherein the document management service exposes a web service application programming interface (API) for obtaining the edits to the structured document.

14. A computer-implemented method for editing a structured document, comprising:

receiving first edits to the structured document at a first instance of a document management service executing in a first data center of a service provider network that is located in a first geographic region, individual ones of the first edits comprising data to be stored in the structured document and identifying a field of the structured document in which the data is to be stored;

transmitting, from a first synchronization service executing in the first data center of service provider network that is located in the first geographic region and associated with the first instance of the document management service, the first edits to the structured document to one or more other synchronization services executing in one or more other data centers of the service provider network that are located in one or more other geographic regions and associated with one or more other instances of the document management service executing in the one or more other data centers of the service provider network that are located in the one or more other geographic regions;

receiving second edits to the structured document from the one or more other synchronization services associated with the one or more other instances of the document management service;

sorting edits, that include the first edits and the second edits, into a sorted order based at least in part on a first region-based counter value associated with the first edits and a second region-based counter value associated with the second edits;

receiving a request for the structured document; and generating the structured document based, at least in part on the sorted order, wherein at least one of the edits further comprises one or more constraints, and wherein the data in the at least one of the edits is not utilized during generation of the structured document if the one or more constraints are not satisfied.

15. The computer-implemented method of claim 14, wherein the structured document comprises text that identifies one or more objects that include one or more properties.

16. The computer-implemented method of claim 14, wherein structured document comprises a trouble ticket.

17. The computer-implemented method of claim 14, wherein the first synchronization service stores the first edits to the structured document utilizing a database service.

18. The computer-implemented method of claim 14, wherein a database service executing in the service provider network is configured to store the first and second edits to the structured document.

19. The computer-implemented method of claim 14, wherein the first region-based counter value tracks a number of writes.

20. The computer-implemented method of claim 14, wherein the document management service is further configured to expose an application programming interface (API) for receiving the first edits to the structured document and for obtaining the first edits and the second edits to the structured document.

* * * * *